US007546145B2

(12) United States Patent
Ramos-Escaño et al.

(10) Patent No.: US 7,546,145 B2
(45) Date of Patent: Jun. 9, 2009

(54) METHOD, NETWORK NODE AND SYSTEM FOR MANAGING INTERFACES IN A DISTRIBUTED RADIO ACCESS NETWORK

(75) Inventors: Gabriel Ramos-Escaño, Málaga (ES); Fabio Longoni, Málaga (ES)

(73) Assignee: Nokia Corporation, Espoo (FI)

( * ) Notice: Subject to any disclaimer, the term of this patent is extended or adjusted under 35 U.S.C. 154(b) by 1121 days.

(21) Appl. No.: 10/270,175

(22) Filed: Oct. 15, 2002

(65) Prior Publication Data
US 2004/0071126 A1    Apr. 15, 2004

(51) Int. Cl.
*H04M 1/00* (2006.01)
*H04B 7/00* (2006.01)
*H04Q 7/20* (2006.01)
*H04J 3/24* (2006.01)

(52) U.S. Cl. .................. 455/561; 455/524; 455/525; 370/349

(58) Field of Classification Search .................. 455/561, 455/524, 525, 562.1, 445, 435, 432.1, 422.1, 455/560; 370/466, 328, 352
See application file for complete search history.

(56) References Cited

U.S. PATENT DOCUMENTS 6,879,832 B1 *  4/2005  Muller et al. ............... 455/445
7,471,957 B2 * 12/2008  Palkisto et al. .............. 455/458
2004/0082366 A1 *  4/2004  Longoni et al. ............. 455/561

FOREIGN PATENT DOCUMENTS

WO    WO 00/54521    9/2000
WO    WO 00/60824    10/2000

OTHER PUBLICATIONS

3GPP-ETSI TR 125 933 V5.1.0, "Universal Mobile Telecommunications System (UMTS); IP transport in UTRAN (3GPP TR 25.933 version 5.1.0 Release 5)", Jun. 2002, pp. 1-130.
International Search Report for International Application No. PCT/FI03/00610.

* cited by examiner

*Primary Examiner*—Tilahun B Gesesse
(74) *Attorney, Agent, or Firm*—Squire, Sanders & Dempsey, LLP

(57) ABSTRACT

The present invention describes a novel method, radio access node and system for specifying and interpreting identifiers in a telecommunications system. In the method of the present invention, an RNC identifier extension element extending the RNC identifier is created and one or more radio access network nodes are specified with the RNC identifier and RNC identifier extension element extending the RNC identifier in the first and/or second interface instance. In a preferred embodiment, the RNC identifier and RNC identifier extension element extending the RNC identifier specify a radio network access server and an IP base station in the second interface.

27 Claims, 3 Drawing Sheets

METHOD, NETWORK NODE AND SYSTEM FOR MANAGING INTERFACES IN A DISTRIBUTED RADIO ACCESS NETWORK

FIELD OF THE INVENTION

The present invention relates to the telecommunication systems. In particular, the present invention relates to a novel and improved method and system for using and interpreting interface identifiers in a correct way in a telecommunication system.

BACKGROUND OF THE INVENTION

In the current specifications of the third generation mobile networks (referred to as UMTS), the system utilizes the same well-known architecture that has been used by all main second-generation systems. A block diagram of the system architecture of current UMTS network is presented in FIG. 1. The UMTS network architecture includes the core network (CN), the UMTS terrestrial radio access network (UTRAN), and the user equipment (UE). The core network is further connected to the external networks, i.e. Internet, PLMN, PSTN and/or ISDN.

The GSM Phase 1/2 Core Network consists of network switching subsystem (NSS). The NSS further consists of the following functional units: Mobile Switching Center (MSC), Visitor Location Register (VLR), Home Location Register (HLR), Authentication Center (AC) and equipment identity register (EIR). The GSM Phase 2+ enhancements to the GSM phase 1/2 CN are serving GPRS (General Packet Radio Service) support node (SGSN), gateway GPRS support node (GGSN) and CAMEL service environment. The most important new feature that is introduced with the GPRS is the packet switching (PS), which improves the capacity of the network.

The UTRAN architecture consists of several radio network subsystems (RNS). The RNS is further divided into the Radio Network Controller (RNC) and several base stations (BTS, referred to as B nodes in the $3^{rd}$ Generation Partnership Project (3GPP) specifications).

In this architecture there are several different connections between the network elements. The Iu interface connects the CN to the UTRAN. The Iur interface enables the exchange of signaling information, as well as the establishment of user plane connections, between two RNCs. The signaling protocol across the Iur interface is called the Radio Network Subsystem Application Part (RNSAP). The RNSAP is terminated at both ends of the Iur interface by an RNC. The Iub interface connects an RNC and a node B. The Iub interface allows the RNC and node B to negotiate about radio resources, for example, to add and delete cells controlled by node B to support communication of dedicated connection between UE and S-RNC, information used to control the broadcast and paging channels, and information to be transported on the broadcast and paging channels. One node B can serve one or multiple cells. The UE is connected to node B through the Uu radio interface. The UE further consists of a subscriber identity module (USIM) and mobile equipment (ME). They are connected by the Cu interface. Connections to external networks are made through a gateway MSC (towards circuit switched networks) or GGSN (towards packet switched networks).

In order to obtain the most efficient RAN architecture, which is based on using the good characteristics of IP, some functionality has to be relocated between network elements. In the most revolutionary architecture we no longer have a network element commonly known as a BSC (Base Station Controller) or RNC (Radio Network Controller), although this functionality must remain in the RAN. In one embodiment of the IP RAN, there has been chosen to locate some RNC functionality in the BTSs to enable e.g. soft handover and associated signaling to happen along the shortest path, producing minimum delay and signaling load to those parts of networks where this is not necessary. Referring to the above state of art description it can be said that IP RAN is realized by implementing most of the RNC (or BSC) functionality in the BTS (IP BTS). Only Paging, basic O&M (Operation and Maintenance) and configurations, location calculation functions and common radio resource management may be implemented in separate servers outside the BTS site.

In the distributed architecture of IP RAN, the distributed functionalities of RNC/BSC from the CN's or neighboring radio network's point of view are hidden. In an IP RAN architecture, the introduction of the Radio Network Access Server (RNAS, a signaling GW) and Radio Access Network Gateway (RNGW)/Circuit Switched Gateway (CSGW) (user plane GWs) creates two instances of the Iu interface from the core network towards the IP BTS. The same happens with the Iur interface from a conventional RNC to an IP BTS. The presence of two instances of the Iu and Iur interfaces for interworking reasons is one of the main characteristic of the IP RAN Distributed architecture.

The IP RAN is a distributed architecture, where the RNAS and GWs are hiding the mobility to the core network. The current RAN architecture is not a distributed architecture. For a correct interworking of the two instances of Iu and Iur interfaces, the e.g. RNSAP and RANAP protocols in the inner instance of the interface (Iu', Iur") are not directly applicable. One problem is that the current RNC ID address space (12 bits) is not enough to specify the source IP BTS and target IP BTS in Iu' interface during the relocation procedure. Additional problem is the addressing of connectionless messages in case of Iur" interface (for example, Uplink Signaling Transfer, Paging Request). In this case, as far as the RNAS acts as interworking signaling unit, the identity of the receiving entity (RNC) has to be included into those messages so that RNAS can address properly this receiving entity.

Therefore, the RNSAP and RANAP protocols in the inner instance of the interface (Iu', Iur") need to be modified in the handling of the instance identifiers. Without the solution described in the present invention it is not possible to implement the IP radio access network.

SUMMARY OF THE INVENTION

The present invention describes a novel and improved method, network node and system for managing signaling bearer connection parameters in an interface instance between one or more radio network access servers of a distributed radio access network and at least one of the networks selected from a group of networks comprising a core network and a neighboring radio access network and also in the distributed radio access network.

One objective of the present invention is to provide an addressing method in a telecommunication system comprising a first interface instance between one or more radio network access servers and at least one of the networks selected from a group of networks comprising a core network and a neighboring radio access network and a second interface instance between one or more radio network access servers and a set of IP base stations. An RNC identifier is used to specify a radio access network node in the first interface instance.

The problem of the current systems is that the current RNC ID address space is only 12 bits. This is not enough to specify a unique identification for a source or target IP base station. Therefore, in the method of the present invention, an RNC identifier extension element extending the RNC identifier is created and one or more radio access network nodes are specified with the RNC identifier and RNC identifier extension element extending the RNC identifier in the first and/or second interface instance. In a preferred embodiment, the RNC identifier and RNC identifier extension element extending the RNC identifier specify a radio network access server and an IP base station in the second interface.

In an embodiment of the present invention, the method further comprises the step of creating a target serving IP BTS identifier element with which an IP base station and the gateway radio network access server are specified in the first interface instance. The target serving IP BTS identifier element is preferably incorporated in the Source RNC to Target RNC transparent or Old BSS to New BSS container used in the first interface instance.

In an embodiment of the present invention, the method further comprises the steps of reading the content of the Target RNC ID information element and the Target RNC ID information element extension element and copying the read information into the target serving IP BTS identifier information element used in the first interface instance.

In an embodiment of the present invention, the RNC identifier extension element is used to extend the Source RND ID, Target RNC ID and/or Drift RNC ID information element in the first and/or second interface.

In an embodiment of the present invention, with connectionless messages interworking with a conventional radio access network a destination RNC identifier is sent within one or more of the following messages: an uplink signaling transfer indication, a paging request, a downlink signaling transfer indication, a reset request or a reset response.

In an embodiment of the present invention, the 3GPP RANAP and/or RNSAP specifications are changed to include the RNC identifier extension element the RNC identifier.

In an embodiment of the present invention, the method further comprises the step of specifying a radio network access server, an IP base station, and user equipment in the second interface instance with a three-part form identifier wherein the first part identifies a radio network access server, the second part identifies an IP base station, and the third part identifies user equipment.

According to another aspect, the invention relates to a system comprising a first interface instance between one or more radio network access servers and at least one of the networks selected from a group of networks comprising a core network and a neighboring radio access network and a second interface instance between the one or more radio network access servers and a set of IP base stations. An RNC identifier is used to specify a radio access network node in the first interface instance.

According to the invention, the system further comprises an RNC identifier extension element used to extend the RNC identifier, wherein one or more radio access network nodes are specified with the RNC identifier and the RNC identifier extension element extending the RNC identifier in the first and/or second interface instance. In a preferred embodiment, the RNC identifier and RNC identifier extension element extending the RNC identifier specify a radio network access server and an IP base station in the second interface.

In an embodiment of the present invention, the system further comprises a target serving IP BTS identifier element specifying an IP base station and the gateway radio network access server in the first interface instance. The target serving IP BTS identifier element is preferably incorporated in the Source RNC to Target RNC transparent or Old BSS to New BSS container used in the first interface instance.

In an embodiment of the present invention, the system further comprises means for reading the content of the Target RNC ID information element and the Target RNC ID information element extension element and means for copying read information into the target serving IP BTS identifier information element used in the first interface instance.

In an embodiment of the system of the present invention, the RNC identifier extension element is used to extend the Source RND ID, Target RNC ID and/or Drift RNC ID information element in the first and/or second interface. The RNC identifier extension element can, however, be used with any other present or future RNC identifier element other than mentioned above.

In an embodiment of the system of the present invention, with connectionless messages interworking with a conventional radio access network a destination RNC identifier is sent within one or more of the following messages: an uplink signaling transfer indication, a paging request, a downlink signaling transfer indication, a reset request or a reset response.

In an embodiment of the system of the present invention, the 3GPP RANAP and/or RNSAP specifications are changed to include the RNC identifier extension element the RNC identifier and/or the target serving IP BTS identifier element.

In an embodiment of the system of the present invention, a radio network access server, an IP base station, and user equipment are specified in the second interface instance with a three-part form identifier wherein the first part identifies a radio network access server, the second part identifies an IP base station, and the third part identifies user equipment.

According to another aspect, the invention relates to a method for interpreting signaling bearer connection parameters in a telecommunication system comprising a first interface instance between one or more radio network access servers and at least one of the networks selected from a group of networks comprising a core network and a neighboring radio access network and a second interface instance between the radio network access server and a set of IP base stations. An RNC identifier is used to identify a radio access network node in the first interface instance. In the method of the present invention, an RNC identifier extension element is used to extend the RNC identifier. Furthermore, a radio network access server and an IP base station are identified based on the RNC identifier and RNC identifier extension element extending the RNC identifier in the second interface instance.

In an embodiment of the present invention, the method further comprises the step of using a target serving IP BTS identifier element with which an IP base station and the gateway radio network access server are identified in the first interface instance The target serving IP BTS identifier element is preferably incorporated in the Source RNC to Target RNC transparent or Old BSS to New BSS container used in the first interface instance.

In an embodiment of the present invention, the method further comprises the steps of reading the content of the Target RNC ID information element and the Target RNC ID information element extension element and copying read information into the target serving IP BTS identifier information element used in the first interface instance.

In an embodiment of the present invention, aforementioned identifying, reading and/or copying capabilities are arranged in radio network access servers and/or IP base stations of an IP radio access network.

In an embodiment of the present invention, the method further comprises the step of specifying a radio network access server, an IP base station, and user equipment in the second interface instance with a three-part form identifier wherein the first part identifies a radio network access server, the second part identifies an IP base station, and the third part identifies user equipment.

According to another aspect, the invention relates to a radio access network node interpreting signaling bearer connection parameters in a telecommunication system comprising a first interface instance to at least one of the networks selected from a group of networks comprising a core network and a neighboring radio access network and/or a second interface instance to radio network access servers or IP base stations. The system comprises means for identifying a radio network access server and an IP base station based on an RNC identifier and RNC identifier extension element extending the RNC identifier.

In an embodiment of the radio access network element of the present invention, the means for identifying are arranged to identify an IP base station and the gateway radio network access server in the first interface instance based on a target serving IP BTS identification element used in the first interface instance. In an embodiment of the radio access network element of the present invention, the target serving IP BTS identification element is incorporated in the Source RNC to Target RNC transparent or Old BSS to New BSS container used in the first interface instance.

In an embodiment of the radio access network element of the present invention, the radio network access node further comprises means for reading the content of the Target RNC ID information element and the Target RNC ID information element extension element and means for copying read information into the target serving IP BTS identifier information element used in the first interface instance.

In an embodiment of the radio access network element of the present invention, the means for identifying are arranged to identify an RNC identifier in one or more of the following messages: an uplink signaling transfer indication, a paging request, a downlink signaling transfer indication, a reset request or a reset response.

In an embodiment of the radio access network element of the present invention, the means for identifying, reading and copying are arranged in radio network access servers and/or IP base stations of an IP radio access network.

In an embodiment of the radio access network element of the present invention, means for identifying are arranged to identify a radio network access server, an IP base station, and user equipment in the second interface instance based on a three-part form identifier wherein the first part identifies a radio network access server, the second part identifies an IP base station, and the third part identifies user equipment.

The IP RAN is a distributed architecture, wherein the RNAS and GWs are hiding the mobility to the CN. So, for a correct interworking of the two instances of Iu and Iur interfaces, the RNSAP and RANAP protocols in the inner instance of the interface (Iu', Iur'') need to be modified in the handling of the identifiers. The present invention describes the handling of the identifiers in the instances of the interface and the changes required to existing Iu and Iur application parts (RANAP and RNSAP) to support the two instances of the interface. Without the present invention it is not possible to implement an IP RAN.

The present invention provides a solution for e.g. the problems related to the mobility and relocation issues. Furthermore, the extension of the RNC identifier allows the future removal of the interworking units (RNAS, RNGW, CSGW) and the direct connections of the core network and the IP BTSs, by solving the limitation of the addressing space of the identifiers.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
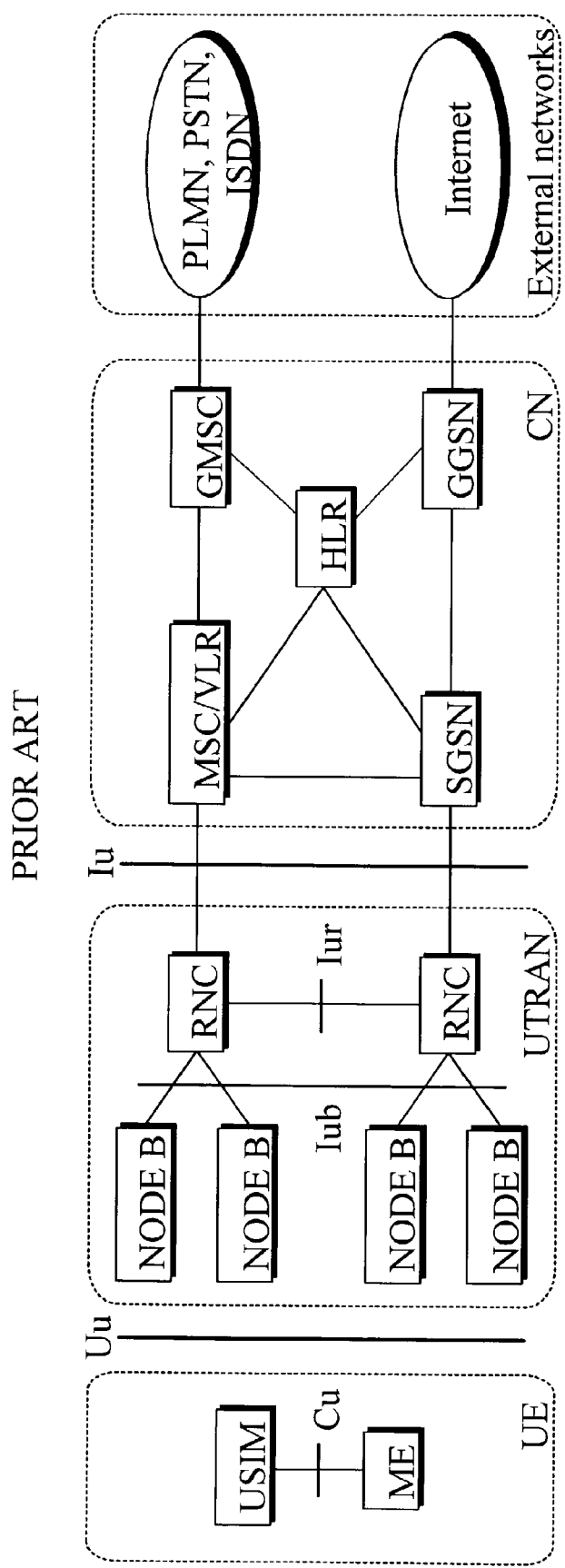
FIG. 1 is a block diagram illustrating a prior art telecommunication network.
Figure 2:
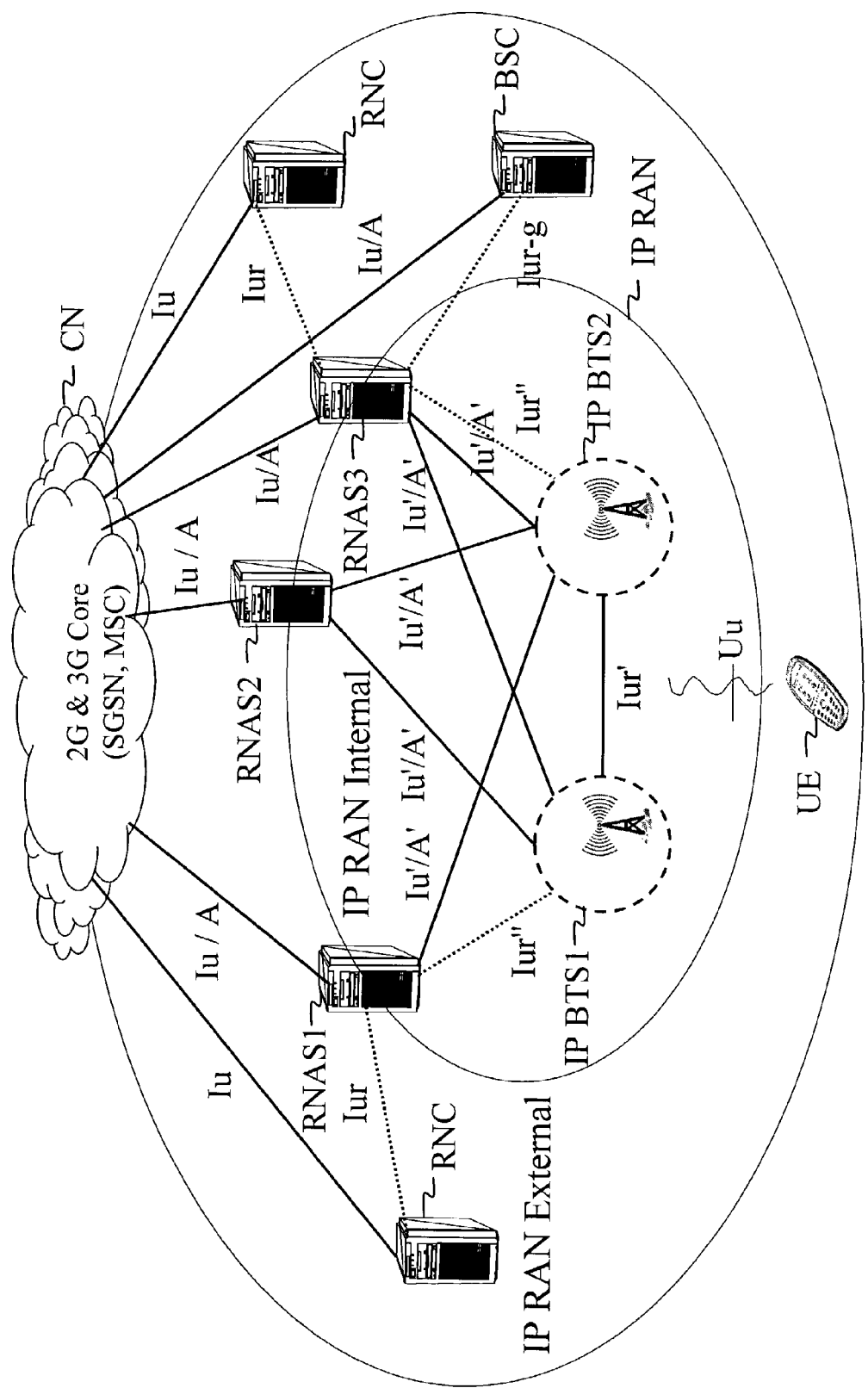
FIG. 2 is a block diagram illustrating an example of the overall system architecture of a distributed radio access network in which the present invention can be applied.

FIG. 2 illustrates an embodiment of a system in which the present invention can be used. The system comprises a core network CN connected to the IP radio access network IP RAN via the Iu interface. The Iu interface is described in more detail e.g. in the 3GPP specifications TS 25.410-25.415. In FIG. 2, the IP radio access network IP RAN comprises radio network access servers RNAS1, RNAS2, RNAS3 and IP base stations IP BTS1, IB BTS2. The radio network access servers are connected to the IP base stations via the Iu'/A' or Iur'' interfaces. The radio network access server RNAS1 is connected to the RNC via the Iur interface. The Iur interface is described in more detail e.g. in the 3GPP specifications TS 25.420-25.427. The radio network access server RNAS3 is connected to the BSC via the Iur-g interface. User equipment UE is connected to the IP base stations via the Uu interface.

The radio network access server acts as a signaling gateway between RAN and CN. It has the following functions. It discriminates the control plane messages of the Iu and A interfaces and relays them further. It also can have paging server functions, i.e. the RNAS keeps track of the UE RRC (Radio Resource Control) status and location, processes the idle mode paging messages and other connectionless messages from the core network CN, and forwards them to the IP BTS controlling the cell the message is targeted to. In more detail, the RNAS has, for example, the following functions: RANAP connection termination, setup and release of the signaling connections, discrimination of connectionless messages processing of RANAP connectionless protocol messages, storing of information of the existing radio resource control (RRC) connection, relaying of idle mode paging message to the relevant entities, reset and overload control and management of reset and overload messages to/from the CN etc.

Outside the IP RAN is the IP RAN external part comprising elements of other radio access networks. FIG. 2 comprises two Radio Network Controllers RNC of a UTRAN. Furthermore, FIG. 2 comprises a Base Station Controller BSC of e.g. a Global System for Mobile communications (GSM) system.

In the IP RAN architecture, the introduction of the RNAS (signaling gateway) and RNGW/CSGW (user plane gateways) creates two instances of the Iu interface from the CN towards the IP BTS. The same happens with the Iur interface from conventional RNC to the IP BTS. The presence of two instances of the Iu and Iur interfaces for interworking reasons is one of the main characteristics of the IP RAN Distributed architecture. The present describes the handling of the identifiers in the IP RAN, and the changes required to existing Iu and Iur application parts (RANAP and RNSAP) to support the two instances of the interface.

The IP RAN is interfaced to the external RANs and the CN via the 3GPP interfaces (Iu, Iur, A) and protocols. The same protocols are also used inside the IP RAN internal interfaces (Iur", Iur', Iu', A'). As a consequence, the identifiers defined in the current GSM-RAN/UTRAN standard interfaces are also used within the IP RAN. In some cases, those identifiers need to be interpreted or used in a different way than they are used outside the IP RAN. Additionally, new identifiers and parameters need to be included in the IP RAN internal interfaces. The present invention provides a solution for this problem related the mobility and relocation issues.

The problem in the Iu' interface (RNAS-IP BTS) with relocations is that the current RNC ID address space (12 bits) is not enough to specify the source IP BTS and target IP BTS (and drift IP BTS in case of relocation with the drift) in the Iu' interface during the relocation. For this reason, any occurrence of the RNC ID in the Iu' interface (for example, the Source RNC ID, the Target RNC ID (and Drift RNC ID in the Source RNC to Target RNC Transparent Container IE)) are, as described in the present invention, extended in the Iu' by adding a new proprietary information element (IE) called RNC id extension. The same extension is used in the Source RNC to Target RNC transparent container IE in the Iu interface.

For the present invention to be fully usable, the same extension mechanism is necessary in the 3GPP Iu specifications in order to have an open interface to the IP BTS.

In case of RNAS relocation, the Source IP BTS uses the target RNASid as the Target RNC ID IE on the Iu' Relocation required message. But the target RNAS has no information about which is the target IP BTS. The solution is to include the Target Serving IP BTS ID IE in the Source RNC to Target RNC Transparent Container IE.

The following table shows which are the modifications and different interpretations of the information elements in the relocation procedures.

| Information element | Modification | Iu' interface | Iu Interface |
| --- | --- | --- | --- |
| Source RNC ID | Extension added on Iu' and A' by introducing a new IE | RNCID + RNCID-EXT = Complete IP BTS id (gateway RNASid + IP BTSid) | RNC ID = source RNC/RNAS ID. |
| Target RNC ID | Extension added on the Iu' and A' (in case of IS handover) by introducing a new IE | RNCID + RNCID-EXT = Complete IP BTS id (gateway RNASid + IP BTSid) | RNC ID = target RNC/RNAS ID. |
| Target Serving IP BTS ID (TS-IPBTS) | New IE in the Source RNC to the target RNC transparent container on IU | This IE is not needed in Iu' interface (information about target IP BTS included in the Target RNCID IE) | Target IP BTS ID = gateway RNAS + IP BTSid. Note: gateway RNAS can be different from the target RNAS included in the target RNCID IE |
| Drift RNC ID (needed only in case of enhanced Iu relocation keeping drift RNC) | Extension added on the Iu' and Iu by introducing a new IE | Drift RNCID + RNCID-EXT = Drift IP BTS: Complete IP BTSid gateway RNASid + IP BTSid) Drift RNC: RNCID (extension not used). | Drift RNCID + RNCID-EXT = Drift IP BTS: Complete IP BTSid (gateway RNASid + IP BTSid) Drift RNC: RNCID (extension not used). |

In the Iu' interface the RNC identifier RNCID is extended by defining a new RNCID-EXT identifier field. In the Iu interface the extended RNC identifier specifies an RNC or RNAS depending on the radio access network in question. Actually, RNAS as an interworking signaling unit, is seen by the neighbor RNC and by the core network as another RNC.

As mentioned before, two roles of the RNAS are defined:

Gateway RNAS: The RNAS that is included in the complete IP BTS-ID identifier definition. The gateway RNAS is the one used for interworking with an RNC/BSC. There exists one gateway RNAS predefined for each IP BTS. The gateway RNAS identifier is included as serving RNC identifier in the air interface. For identification purposes, one IP BTS belongs to one gateway RNAS area. In FIG. 2, the Iur" interface is the interface between the Gateway RNAS and the IP BTS.

Serving RNAS: The RNAS that manage the Iu/A connection for the UE. Iu'/A' are the interfaces between the serving RNAS and the serving IP BTS. The serving RNAS is not necessarily also the gateway RNAS for the IP BTS. One IP BTS may be connected to different serving RNASs.

FIG. 2 and the associated description describes the present invention mainly using the Iu interface as an example. It is, however, obvious that in the case of the A interface it is the BSC (Base Station Controller) that uses the RNC ID.

In one embodiment of FIG. 2, an RNC identifier is included in the Iur" connectionless messages (e.g. an uplink signaling transfer message, a downlink signaling transfer message, a paging request message, a reset request or a reset response). The problem at the moment is that aforementioned Iur" connectionless messages are not sent directly from the source IP BTS to the target RNC, but using the RNAS as a signaling gateway. In that case, there is a need to specifically specify which will be the target RNC (the one receiving the message), so that the RNAS can perform the correct routing. Therefore, the RNSAP protocol used in the Iur" interface need to include the destination RNC identifier in the aforementioned messages.

The RNC identifier extension element can also be used with any other present or future RNC identifier elements other than mentioned above.

Figure 3:
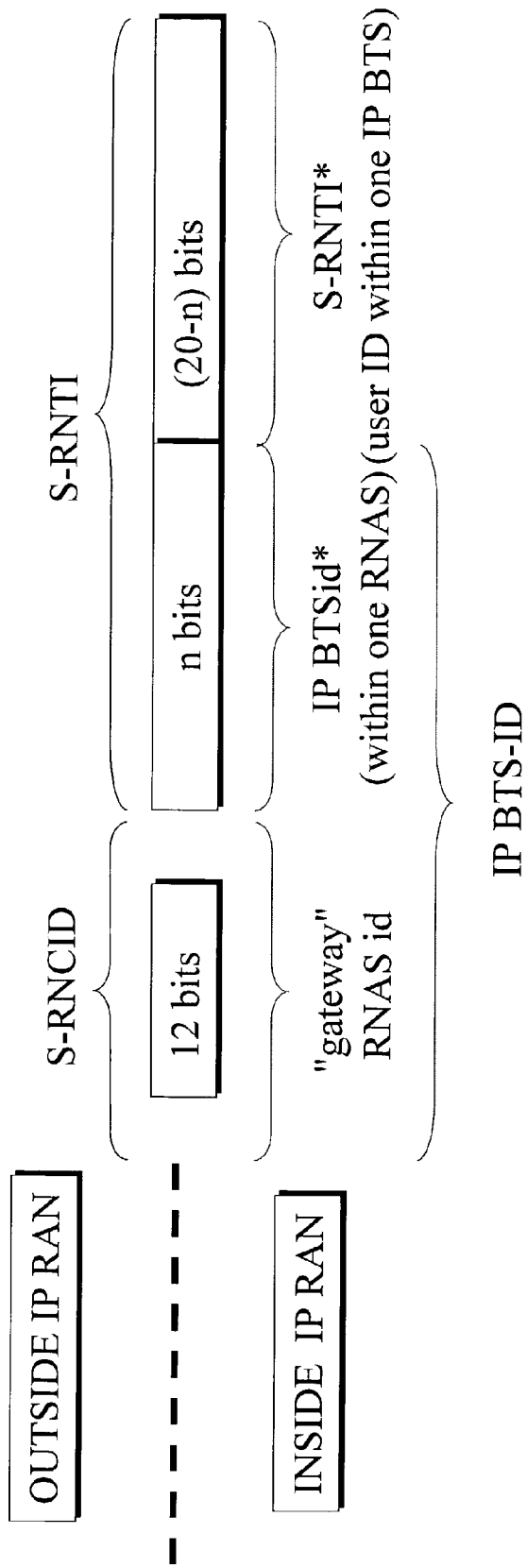
FIG. 3 is a block diagram of identity definitions inside and outside an IP RAN.

FIG. 3 illustrates the mapping between the U-RNTI protocol identifiers and the IP BTS identifier. The U-RNTI is allocated to all UEs having an RRC (Radio Resource Control) connection and it identifies the UE within the IP RAN, and identify univocally the user. It is defined as:

Outside the IP RAN (SRNC id (12 bits)+S-RNTI (20 bits).
Inside the IP RAN: gateway RNASid+(IP BTSid*+S-RNTI*).

The n most significant bits of the S-RNTI are used as IP base station identifier BTSid* (identifies one IP BTS within one gateway RNAS area). The rest of the bits are used for the S-RNTI* (identify one UE connection uniquely within the IP BTS). An IP BTS is identified with the gateway RNAS ID and IP BTS id. This identifier can implicitly be presented in different formats: RNCID+SRNTI, RNCID+RNCID extension, or simply RNCID+IP BTS ID.

The number of bits to be used for the IP BTSid* and for S-RNTI* is decided at the configuration stage, and different BTS may use different divisions between IP BTSid* and S-RNTI*, even if they are under the same RNAS. For example, an IP BTS at the center of a star point may have a large range reserved for the S-RNTI* while a small capacity indoor IP BTS need only a few bits for the S-RNTI*. In other words, several IP BTSids* could be assigned to one IP BTS for the support of a more number of users. Several RNC-ids may be assigned to an RNAS, so that the RNAS can support a higher number of users/IP base stations.

Figure 4:
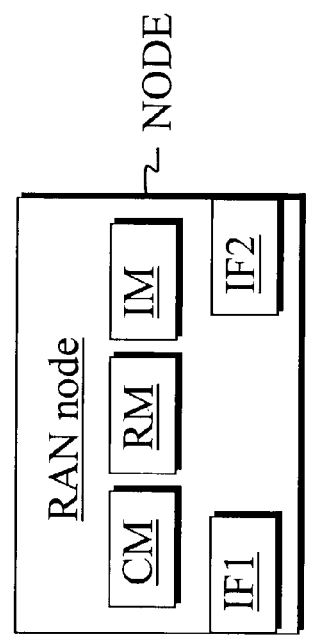
FIG. 4 is a block diagram of an exemplary radio access network node in accordance with the present invention.

FIG. 4 describes an exemplary radio access network node NODE in accordance with the present invention. The radio network element in FIG. 4 comprises two interface: a first interface IF1 towards the core network and nodes in other radio access network(s) and a second interface IF2 towards IP base stations. The radio access network node NODE comprises means for identifying IM a radio network access server and an IP base based on an RNC identifier and RNC identifier extension element extending the RNC identifier.

In one embodiment of FIG. 4, means for identifying IM are arranged to identify an IP base station and the gateway radio network access server in the first interface IF1 based on a target serving IP BTS identification element used in the first interface instance IF1.

In one embodiment of FIG. 4, the radio network access node NODE further comprises means for reading RM the content of the Target RNC ID information element and the Target RNC ID information element extension element and means for copying CM read information into the target serving IP BTS identifier information element used in the first interface instance IF1. The target serving IP BTS identification element is incorporated in the Source RNC to Target RNC transparent container used in the first interface instance IF1.

In one embodiment of FIG. 4, means for identifying IM are arranged to identify an RNC identifier in one or more of the following messages: an uplink signaling transfer indication, a paging request, a downlink signaling transfer indication, a reset request or a reset response.

In one embodiment of FIG. 4, means for identifying IM are arranged to identify a radio network access server, an IP base station, and user equipment in the second interface instance IF2 based on a three-part form identifier wherein the first part identifies a radio network access server, the second part identifies an IP base station, and the third part identifies user equipment.

In one embodiment of FIG. 4, the radio access network node NODE is a radio network access server (RNAS). In another embodiment of FIG. 4, the radio access network node NODE is an IP base station (IP BTS). In this case, however, it may be possible that one or more of the aforementioned interfaces or means are not needed. The aforementioned means are preferably implemented with software and/or hardware, and therefore, they are not described in more detail.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method, comprising:
   identifying a radio access network node in a first interface instance based on a radio network controller identifier, the first interface instance being between one or more radio network access servers and at least one of a core network and a neighboring radio access network;
   creating a radio network controller identifier extension element extending said radio network controller identifier; and
   specifying one or more radio access network nodes with said radio network controller identifier and said radio network controller identifier extension element extending said radio network controller identifier in said first interface instance and/or a second interface instance, the second interface instance being between said one or more radio network access servers and a set of internet protocol base stations.

2. The method according to claim 1, wherein the method further comprises:
   specifying a radio network access server and an internet protocol base station with said radio network controller identifier and radio network controller identifier extension element extending said radio network controller identifier in said second interface instance.

3. The method according to claim 1, wherein the method further comprises:
   creating a target serving internet protocol base transceiver station identifier information element; and
   specifying an internet protocol base station and a gateway radio network access server in said first interface instance based on said target serving internet protocol base transceiver station identifier information element.

4. The method according to claim 3, wherein the method further comprises:
   reading a content of a target radio network controller identification information element and a target radio network controller identification information extension element; and
   copying said read content into said target serving internet protocol base transceiver station identifier information element used in said first interface instance.

5. The method according to claim 3, wherein said target serving internet protocol base transceiver station identifier information element is incorporated in a source radio network controller to a target radio network controller transparent or an old base station subsystem to a new base station subsystem container used in said first interface instance.

6. The method according to claim 1, wherein the method further comprises:
   using said radio network controller identifier extension element to extend a source radio network controller identification information element, a target radio network controller identification information element and/or a drift radio network controller identification information element in said first interface instance and/or said second interface instance.

7. The method according to claim 1, wherein with connectionless messages interworking with a conventional radio access network, the method further comprises:
   sending a destination radio network controller identifier within one or more of the following messages:
   an uplink signaling transfer indication;
   a paging request;
   a downlink signaling transfer indication;

a reset request; or a reset response.

8. The method according to claim 7, wherein the method further comprises:

changing radio network subsystem application part specifications to comprise said destination radio network controller identifier within one or more of the following messages:

an uplink signaling transfer indication;

a paging request;

a downlink signaling transfer indication;

a reset request; or a reset response.

9. The method according to claim 1, wherein the method further comprises:

changing radio access network application protocol and/or radio network subsystem application part specifications to comprise said radio network controller identifier extension element extending said radio network controller identifier and/or a target serving internet protocol base transceiver station identifier information element.

10. The method according to claim 1, wherein the method further comprises:

specifying a radio network access server, an internet protocol base station, and user equipment in said second interface instance with a three-part form identifier, wherein a first part of said three-part form identifier identifies said radio network access server, a second part of said three-part form identifier identifies said internet protocol base station, and a third part of said three-part form identifier identifies said user equipment.

11. A system, comprising:

a first interface instance arranged between one or more radio network access servers and at least one network of a core network and a neighboring radio access network, a second interface instance arranged between said one or more radio network access servers and a set of internet protocol base stations, a radio network controller identifier configured to specify a radio access network node in said first interface instance; and a radio network controller identifier extension element configured to extend said radio network controller identifier, wherein one or more radio access network nodes are specified with said radio network controller identifier and said radio network controller identifier extension element extending said radio network controller identifier in said first interface instance and/or said second interface instance.

12. A method, comprising:

identifying a radio access network node in a first interface instance based on a radio network controller identifier, the first interface instance being between one or more radio network access servers and at least one network of a core network and a neighboring radio access network;

creating a radio network controller identifier extension element extending said radio network controller identifier; and identifying a radio network access server and an internet protocol base station based on said radio network controller identifier and radio network controller identifier extension element extending said radio network controller identifier in said second interface instance, the second interface instance being between said radio network access server and a set of internet protocol base stations.

13. The method according to claim 12, wherein the method further comprises:

using a target serving internet protocol base transceiver station identification element in said first interface instance; and identifying an internet protocol base station and a gateway radio network access server in said first interface instance based on said target serving internet protocol base transceiver station identification element.

14. The method according to claim 13, wherein the method further comprises:

reading a content of a target radio network controller identification information element and a target radio network controller identification information extension element; and copying said read content into said target serving internet protocol base transceiver station identification element used in said first interface instance.

15. The method according to claim 14, wherein said identifying, said reading and said copying capabilities are arranged in radio network access servers and/or internet protocol base stations of an internet protocol radio access network.

16. The method according to claim 13, wherein said target serving internet protocol base transceiver station identification element is incorporated in a source radio network controller to a target radio network controller transparent or an old base station subsystem to a new base station subsystem container used in said first interface instance.

17. The method according to claim 12, wherein with connectionless messages interworking with a conventional radio access network, the method further comprises:

identifying a destination radio network controller identifier within one or more of the following messages:

an uplink signaling transfer indication;

a paging request;

a downlink signaling transfer indication;

a reset request; or a reset response.

18. The method according to claim 12, wherein the method further comprises:

identifying a radio network access server, an internet protocol base station, and user equipment in said second interface instance with a three-part form identifier, wherein a first part of said three-part form identifier identifies a radio network access server, a second part of said three-part form identifier identifies an internet protocol base station, and a third part of said three-part form identifier identifies user equipment.

19. An apparatus, comprising:

an identifier configured to identify a radio network access server and an internet protocol base station based on a radio network controller identifier and a radio network controller identifier extension element extending said radio network controller identifier, and configured to identify an internet protocol base station and a gateway radio network access server in a first interface instance based on a target serving internet protocol base transceiver station identification element used in said first interface instance, wherein the first interface instance being between the apparatus and at least one network of a core network and a neighboring radio access network;

a content reader configured to read a content of a target radio network controller identification information element and a target radio network controller identification information extension element; and a copier configured to copy read content into said target serving internet protocol base transceiver station identifier information element used in said first interface instance.

20. The apparatus according to claim 19, wherein said identifier, said content reader, and said copier are arranged in radio network access servers and/or internet protocol base stations of an internet protocol radio access network.

21. An apparatus, comprising:
means for identifying a radio network access server and an internet protocol base station based on a radio network controller identifier and a radio network controller identifier extension element extending said radio network controller identifier;
wherein said means for identifying is configured to identify said radio network access server, said internet protocol base station, and user equipment in a second interface instance based on a three-part form identifier, the second instance being between the apparatus and radio network access servers or a set of internet protocol base stations, and
wherein a first part of said three-part form identifier identifies said radio network access server, a second part of said three-part form identifier identifies said internet protocol base station, and a third part of said three-part form identifier identifies said user equipment.

22. The apparatus according to claim 21, further comprising:
means for specifying said radio network access server and said internet protocol base station with said means for identifying said radio access network node and said radio network controller identifier extension element extending said means for identifying said radio access network node in said second interface instance.

23. The apparatus according to claim 21, further comprising:
means for creating a target serving internet protocol base transceiver station identifier information element; and
means for specifying said internet protocol base station and a gateway radio network access server in said first interface instance based on said target serving internet protocol base transceiver station identifier information element.

24. The apparatus according to claim 21, further comprising:
means for using said radio network controller identifier extension element to extend a source radio network controller identification information element, a target radio network controller identification information element, and/or a drift radio network controller identification information element in said first interface instance and/or said second interface instance.

25. The apparatus according to claim 23, further comprising:
means for reading a content of a target radio network controller identification information element and a target radio network controller identification information extension element; and
means for copying said read content into said target serving internet protocol base transceiver station identifier information element used in said first interface instance.

26. The apparatus according to claim 23, wherein said target serving internet protocol base transceiver station identifier information element is incorporated in a source radio network controller to a target radio network controller transparent or an old base station subsystem to a new base station subsystem container used in said first interface instance.

27. An apparatus, comprising:
means for identifying a radio access network node in a first interface instance, the first interface instance being between one or more radio network access servers and at least one network of a core network and a neighboring radio access network;
means for creating a radio network controller identifier extension element extending said means for identifying said radio access network node; and
means for specifying one or more radio access network nodes with said means for identifying said radio access network node and said radio network controller identifier extension element extending said means for identifying said radio access network node in said first interface instance and/or a second interface instance, the second interface instance being between said one or more radio network access servers and a set of internet protocol base stations.

* * * * *